Sept. 12, 1944. H. R. VITENSE 2,357,859
CONTAINER
Filed Oct. 22, 1942
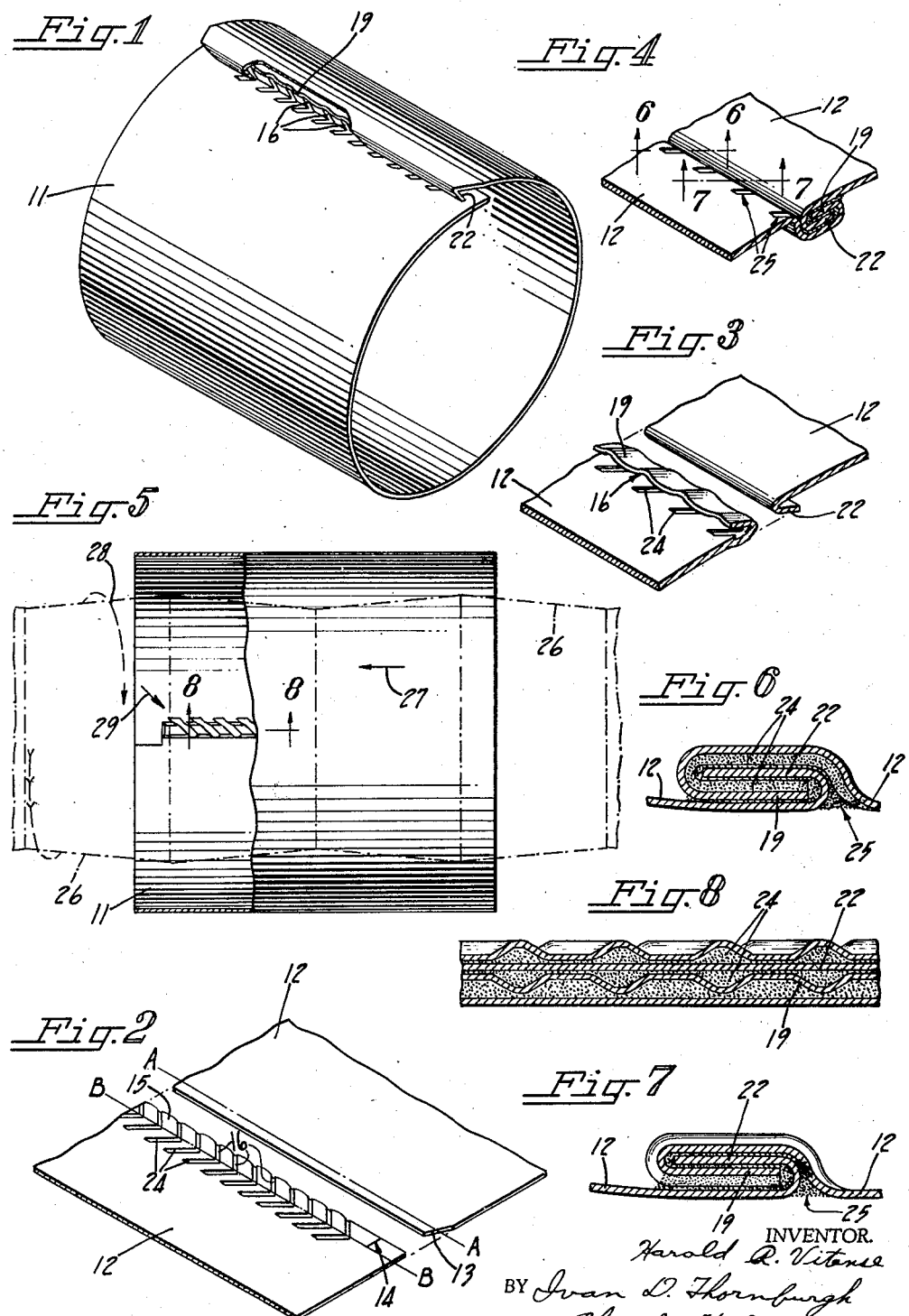
INVENTOR.
Harold R. Vitense
BY Ivan D. Thornburgh
Charles H. Byrne
ATTORNEYS Patented Sept. 12, 1944

2,357,859

UNITED STATES PATENT OFFICE 2,357,859

CONTAINER

Harold R. Vitense, Chicago, Ill., assignor to American Can Company, New York, N. Y., a corporation of New Jersey Application October 22, 1942, Serial No. 462,994

3 Claims. (Cl. 220—81)

This invention relates to sheet metal containers with side seams having interengaged and soldered reversely bent hooks and has particular reference to angularly disposed and spaced corrugations projecting laterally from one of said hooks to provide channels extending into and through the side seam parts at an angle which facilitates the free flow of molten solder into the seam to bond the hooks together.

It is the usual practice in making can bodies from sheet metal to prepare a body blank by shaping oppositely disposed marginal edge portions thereof to provide reversely bent hooks which are interlocked during the formation of the side seam. These hooks extend substantially from end to end of the can body, terminating short of each end where they merge into lap sections of the seam provided to facilitate subsequent flanging of the can body.

The instant invention is directed to such a side seam in which the cooperating hooks are secured together by solder and wherein one of the hooks is formed with transverse double angle corrugations which extend from the outer terminal edge of the hook around the bend in the hook so that when the hook sections are interlocked, a plurality of transverse channels or passages are provided from the exterior of the can body into and throughout the side seam and at an angle to the outer edge of the seam to facilitate free flow of the molten solder into all parts of the seam to bond the layers of metal together.

An object of the invention is the provision of a sheet metal can body having a side seam of novel construction comprising a pair of reversely bent and interlocked hooked sections, wherein one of the hooks is formed with a plurality of spaced and angularly disposed portions projecting laterally from a surface thereof and throughout the width of the seam and between its metal layers, the channels terminating adjacent the exterior surface of the can body and being disposed at an acute angle to the outer edge of the seam to permit of the free flow of fluid solder into and throughout the seam parts and being of a shape and being arranged to facilitate picking up of the solder from a rotating solder roll along which the can body is passed.

Another object of the invention is the provision of such a side seam wherein the channels extend around the bend in the hook and are disposed in the same angular direction along both legs of the hook so that the inflowing solder will be distributed equally to all parts of the seam.

Numerous other objects and advantages of the invention will be apparent as it is better understood from the following description, which, taken in connection with the accompanying drawing, discloses a preferred embodiment thereof.

Referring to the drawing:

Figure 1 is a perspective view of an incomplete can body embodying the present invention and illustrating a formed blank with its opposite hook edges interengaged in readiness to be bumped into a side seam;

Fig. 2 is a perspective view of oppositely disposed side seam edges of a body blank prior to the forming of the hooks shown in Fig. 1, and illustrating the corrugations in one of these side seam edges;

Figs. 3 and 4 are enlarged fragmentary details of the side seam edges shown in Fig. 2, Fig. 3 illustrating the hooks formed on the blank, and Fig. 4 showing how these hooks are interlocked to form the side seam;

Fig. 5 is a top plan view of a tubular can body with parts broken away to show the side seam, the view illustrating the outline of a solder roll along which such a body is propelled while the side seam is being soldered;

Figs. 6 and 7 are enlarged fragmentary sectional views of the side seam taken substantially along the respective lines 6—6 and 7—7 in Fig. 4; and Fig. 8 is an enlarged longitudinal section of the side seam as viewed substantially along the line 8—8 in Fig. 5.

As a preferred embodiment of the instant invention there is shown in the drawing a tubular sheet metal can body 11 (Fig. 1) having an uncompleted lock and lap side seam prior to being bumped in the conventional manner. Such a can body preferably is formed from a previously prepared body blank 12 having its opposite or side seam edges clipped and slit as at 13 and 14 (Fig. 2) to provide for the lap section of the completed side seam.

The slit edge of the body blank designated by the numeral 15 has a series of angularly disposed spaced corrugations or indents 16 projecting laterally from a surface thereof and arranged in a chevron or herringbone pattern along the side seam edge and extending from the outer terminal edge of the blank inwardly and transversely of the side seam portion.

The side seam edge portions of such a blank 12 are folded in the usual manner along longitudinal lines of fold A—A and B—B, as indicated in Fig. 2, to produce a pair of reversely bent inner and outer hooks 19, 22 (Fig. 3) which provide for the lock section of the completed seam. Along the slit edge 15 of the body blank, i. e., along the edge constituting the inner hook 19, the bending takes place across the chevron shaped corrugations 16 at their vertices or peaks of the double angle bars of the chevrons. Bending of the blank edge along this line thus produces a hook in which the corrugations extend around the line of bend and in which the two bars of each chevron extend at the same angle and in the same direction along both legs of the hook.

Following the forming of the hooks 19, 22 they are interengaged as shown in Fig. 1 and are then bumped or pressed together in the usual manner to interlock them in a side seam (Figs. 4 and 5). In such a bumping action the contour of the corrugations is retained while the hooks are folded together into four substantially parallel layers of metal with three intervening spaces.

As a result of this bumping action the corrugations set off, within the spaces between the layers of metal of the seam, a plurality of parallel channels 24 which extend across or transversely of the seam and are at an acute angle to the edge of the blank. This provides free or clear circuitous passageways throughout the entire width of the seam and around the bends in the hooks. As clearly shown in Figs. 6 and 7, these corrugations extend rearwardly sufficiently into the body wall adjacent the line of bend of the outer hook 22 as to form continuing channel openings 25 around the hook. These openings 25 are disposed adjacent the exterior surface of the can body and are located along the outer edge of the seam where it receives the flux and the solder when the seam is subjected to its soldering operation.

The soldering operation immediately follows the bumping of the hooks 19, 22 and this is usually effected by passing the can body over a solder roll 26 (Fig. 5) rotating in a bath of molten solder. During such a soldering operation the rotation of the solder roll forces the solder up into the seam adjacent the bend in the outer hook 22.

In the instant invention this soldering action is greatly facilitated by the annular position of the channels 24. The angular position of these channels is such that when a can body seam is propelled (in a direction indicated by an arrow 27, Fig. 5) along the contacting top edge of the rotating solder roll 26 (rotating in a direction indicated by an arrow 28) the angular direction of the flow of fluid solder (indicated by an arrow 29) from the roll to the can body will correspond to the angular position of the channels. Hence a greater amount of solder will flow more easily into the can body seam when the channels are aligned in this angular position.

The channel openings 25 provide for the reception of a still greater amount of solder from the roll and the angularly disposed channels 24, winding through the spaces of the seam in parallelism, provide for the free flow and uniform distribution of this received solder into all parts of the seam. Any air or solder gases that may be trapped in the seam during the soldering operations is pushed ahead of the incoming fluid solder as it flows through the channels and is readily expelled or vented through the ends of the channels adjacent the bend in the outer hook 22.

In this manner the circuitous angularly disposed channels 19 insure that a sufficient amount of solder is picked up from the solder roll to fill all spaces between the layers of metal of the side seam hooks. This results in a side seam in which all of the layers of metal of the hooks are thoroughly bonded together. Such a side seam is highly desirable in cans carrying products which are required to be packed under high vacuum or high pressures.

It is thought that the invention and many of its attendant advantages will be understood from the foregoing description, and it will be apparent that various changes may be made in the form, construction and arrangement of the parts without departing from the spirit and scope of the invention or sacrificing all of its material advantages, the form hereinbefore described being merely a preferred embodiment thereof.

I claim:

1. A metal can body having a soldered side seam comprising two reversely bent and disposed interengaged hooks forming a plurality of relatively spaced layers of metal adapted to be bonded together by fluid solder applied to the seam while passing the body over a rotating solder roll, one of said hooks having a plurality of spaced corrugations extending outwardly from a surface thereof and also extending transversely of the seam at an acute angle to its outer edge, said corrugations terminating in openings exposed to the exterior of the can body along the outer edge of the seam, said corrugations setting off a series of opposed circuitous channels leading from the exterior surface of the body into and throughout the spaces between the layers of metal of the seam and disposed at an angle to the longitudinal edge of the seam to facilitate free ingress of solder into all parts of the side seam while the can body moves along the rotating solder roll.

2. A metal can body having a soldered side seam comprising two reversely bent and disposed interengaged hooks forming a plurality of relatively spaced layers of metal adapted to be bonded together by fluid solder applied to the seam while passing the body over a rotating solder roll, one of said hooks having a plurality of spaced corrugations extending outwardly from a surface thereof and also extending transversely of the seam at an acute angle to its outer edge and around the bend of the hook, said corrugations terminating in openings exposed to the exterior of the can body along the outer edge of the seam, said corrugations setting off a series of opposed circuitous channels leading from the exterior surface of the body into and throughout the spaces between the layers of metal of the seam and disposed at an angle to the longitudinal edge of the seam to facilitate free ingress of solder into all parts of the side seam while the can body moves along the rotating solder roll.

3. A metal can body having a soldered side seam comprising two reversely bent and disposed interengaged hooks forming a plurality of relatively spaced layers of metal adapted to be bonded together by fluid solder applied to the seam while passing the body over a rotating solder roll, one of said hooks having a plurality of spaced corrugations extending outwardly from a surface thereof at the bend of the hook and also extending along both legs of the hook in the same direction at an acute angle to the outer edge of the seam, said corrugations terminating in openings exposed to the exterior of the can body along the outer edge of the seam, said corrugations also serving to set off a plurality of opposed circuitous channels leading from the exterior surface of the body into and throughout the spaces between the layers of metal of the seam, said channels being disposed at an angle to the longitudinal edge of the seam to facilitate free ingress of solder into all parts of the side seam while the can body moves along the rotating solder roll.

HAROLD R. VITENSE.